(12) United States Patent
Ye et al.

(10) Patent No.: US 12,115,836 B2
(45) Date of Patent: Oct. 15, 2024

(54) INTEGRATED COMPONENT

(71) Applicant: ZHEJIANG SANHUA AUTOMOTIVE COMPONENTS CO., LTD., Zhejiang (CN)

(72) Inventors: Keli Ye, Zhejiang (CN); Fengyan Xu, Zhejiang (CN); Linzhong Wu, Zhejiang (CN); Zhengyi Yin, Zhejiang (CN); Bin Song, Zhejiang (CN)

(73) Assignee: ZHEJIANG SANHUA AUTOMOTIVE COMPONENTS, CO., LTD., Zhejiang (CN)

( * ) Notice: Subject to any disclaimer, the term of this patent is extended or adjusted under 35 U.S.C. 154(b) by 0 days.

(21) Appl. No.: 18/005,655

(22) PCT Filed: Jul. 23, 2021

(86) PCT No.: PCT/CN2021/108076
§ 371 (c)(1),
(2) Date: Jan. 16, 2023

(87) PCT Pub. No.: WO2022/022408
PCT Pub. Date: Feb. 3, 2022

(65) Prior Publication Data
US 2023/0331063 A1 Oct. 19, 2023

(30) Foreign Application Priority Data
Jul. 25, 2020 (CN) .......................... 202010726746.6

(51) Int. Cl.
B60H 1/00 (2006.01)
F16K 11/22 (2006.01)
(Continued)

(52) U.S. Cl.
CPC ..... B60H 1/00885 (2013.01); B60H 1/00899 (2013.01); F16K 11/22 (2013.01);
(Continued)

(58) Field of Classification Search
CPC .... F16K 11/22; F16K 27/0263; F16K 37/005; F16K 27/00; B60H 1/3229;
(Continued)

(56) References Cited

U.S. PATENT DOCUMENTS 5,597,117 A 1/1997 Watanabe et al.
2008/0105310 A1* 5/2008 Ogami .................... F17C 13/04
137/557

(Continued)

FOREIGN PATENT DOCUMENTS

CN 1123892 A 6/1996
CN 203532885 U 4/2014
(Continued)

OTHER PUBLICATIONS

International Search Report dated Oct. 14, 2021 for PCT Appl. No. PCT/CN2021/108076.
(Continued)

Primary Examiner — Atif H Chaudry
(74) Attorney, Agent, or Firm — Ohlandt, Greeley and Perle, LLP

(57) ABSTRACT

An integrated component, used for a vehicular thermal management system, includes a connection portion and a liquid storage portion. The connection portion and the liquid storage portion are connected to form an integrated whole. The integrated component has a liquid storage cavity. The connection portion has channels, said channels including a first channel and a second channel. The first channel comprises a first inlet and a first outlet, a working medium entering the first channel from the first inlet and leaving the first channel through the first outlet. The liquid storage cavity can be in communication with the second channel. The second channel comprises a third outlet, a working medium that passes through the liquid storage cavity leaving (Continued)

the second channel through the third outlet. The connection portion has an installation base, the installation base being in communication with the first channel or the second channel.

18 Claims, 13 Drawing Sheets

(51) Int. Cl.
| | |
|---|---|
| *F16K 27/00* | (2006.01) |
| *F16K 27/02* | (2006.01) |
| *F16K 37/00* | (2006.01) |
| *F25B 41/40* | (2021.01) |
| *F25B 41/42* | (2021.01) |
| *F25B 41/45* | (2021.01) |
| *F25B 41/48* | (2021.01) |
| *F28F 9/02* | (2006.01) |
| *F28F 9/26* | (2006.01) |

(52) U.S. Cl.
CPC .......... *F16K 27/00* (2013.01); *F16K 27/0263* (2013.01); *F16K 37/005* (2013.01); *F25B 41/40* (2021.01); *F25B 41/42* (2021.01); *F25B 41/45* (2021.01); *F25B 41/48* (2021.01); *F28F 9/0275* (2013.01); *F28F 9/26* (2013.01)

(58) Field of Classification Search
CPC ............ B60H 1/00485; B60H 1/00885; B60H 1/00899; F25B 41/40; F25B 41/42; F25B 41/45; F25B 41/48; F28F 9/26; F28F 9/0275

See application file for complete search history.

(56) References Cited

U.S. PATENT DOCUMENTS

| | | | |
|---|---|---|---|
| 2012/0132298 A1* | 5/2012 | Ishitoya | .................. F16K 1/307 137/511 |
| 2017/0059218 A1 | 3/2017 | Oh | |
| 2019/0225055 A1 | 7/2019 | Hosokawa et al. | |
| 2019/0299126 A1 | 10/2019 | Osaki et al. | |

FOREIGN PATENT DOCUMENTS

| | | | |
|---|---|---|---|
| CN | 104728483 A | 6/2015 |
| CN | 106482403 A | 3/2017 |
| CN | 2020067123 A | 4/2020 |
| EP | 2889553 A1 | 7/2015 |
| JP | 2018-090049 A | 6/2018 |
| JP | 2018-105552 A | 7/2018 |
| JP | 2020067123 A | 4/2020 |

OTHER PUBLICATIONS

Japanese Office Action Feb. 6, 2024 for Japanese Appl. No. 2023-501495.

* cited by examiner

INTEGRATED COMPONENT

The present application is the national phase of International Patent Application No. PCT/CN2021/108076, titled "INTEGRATED COMPONENT", filed on Jul. 23, 2021, which claims the priority to Chinese Patent Application No. 202010726746.6, titled "INTEGRATED COMPONENT", filed with the China National Intellectual Property Administration on Jul. 25, 2020, both of which are incorporated herein by reference thereto in their entireties.

FIELD

The present application relates to a component of a vehicle thermal management system, and in particular to an integrated component.

BACKGROUND

A vehicle thermal management system includes an air conditioning system, where the air conditioning system includes a liquid reservoir and a valve assembly. The reservoir and the valve assembly are generally connected to the system through pipelines. In this way, the installation of parts is complicated and the occupied space is large. How to simplify the installation and make the structure compact while satisfying the functions of the parts is a problem to be solved.

SUMMARY

An object of the present application is to provide an integrated component to simplify installation and make the structure more compact.

To achieve the above object, the following technical solution is provided according to the present application. An integrated component, which is used in a vehicle thermal management system, includes a connecting part and a liquid storage part, where the connecting part and the liquid storage part are connected as a whole, where the integrated component has a liquid storage cavity, where the connecting part has a channel, and the channel includes a first channel and a second channel. The first channel and the second channel are independently arranged. The first channel includes a first inlet and a first outlet, the working medium enters the first channel from the first inlet, and at least part of the working medium leaves the first channel through the first outlet. The liquid storage cavity is communicated with the second channel. The second channel includes a third outlet. The working medium passing through the liquid storage cavity leaves the second channel through the third outlet. The connecting part has a mounting seat, where the mounting seat is communicated with the first channel or the second channel, so that components in the thermal management system can be positioned on the mounting seat.

In the integrated component of the present application, the connecting part is hermetically connected with the liquid storage part, and the connecting part is provided with a mounting seat. The mounting seat is communicated with the first channel or the second channel, so that components in the thermal management system can be positioned on the mounting seat. The connecting part provides multiple connecting ports for the assembly of the integrated component with the vehicle thermal management system, which facilitates the assembly of the integrated component and simplifies the assembly process. In addition, the structure of the integrated component is simple and compact, and no additional connecting pipe is required.

DETAILED DESCRIPTION OF THE EMBODIMENTS

Figure 1:
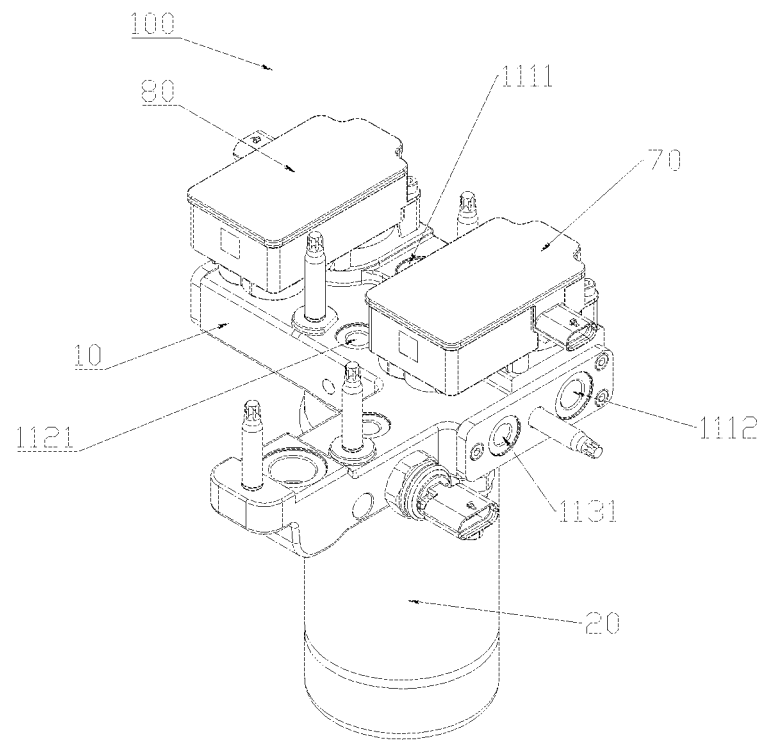
FIG. 1 is a perspective view of a first embodiment of an integrated component according to the present application.
Figure 2:
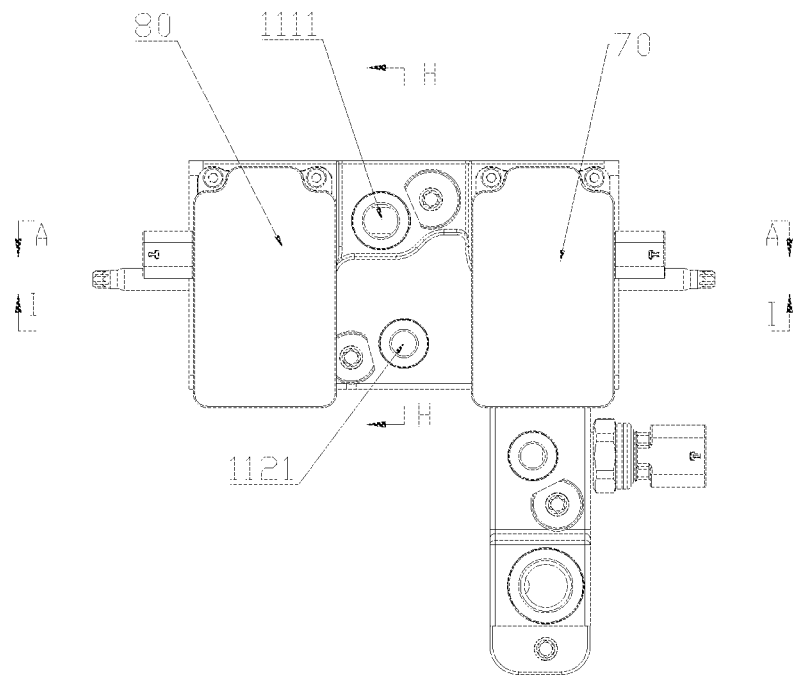
FIG. 2 is a top view of the integrated component of FIG. 1.

The present application is further illustrated hereinafter in conjunction with drawings and specific embodiments.

The integrated component in this application can be used in a vehicle thermal management system, where the vehicle may be a new energy vehicle. Referring to FIG. 1 to FIG. 29, an integrated component 100 includes a connecting part 10 and a liquid storage part 20, where the connecting part 10 and the liquid storage part 20 are connected as a whole. The connecting part 10 has a channel, and the channel includes a first channel 111 and a second channel 112. The first channel 111 and the second channel 112 are independently arranged. The integrated component 100 has a liquid storage cavity 30, and the liquid storage cavity 30 is configured to store a liquid working medium. The first channel 111 is formed with a first inlet 1111 and a first outlet 1112 and/or a second outlet 1113 on an outer surface of a wall of the connecting part 10. The working medium enters the first channel 111 from the first inlet 1111, and at least part of the working medium leaves the first channel 111 through the first outlet 1112 and/or the second outlet 1113. The liquid storage cavity 30 can communicate with the second channel 112. The second channel 112 forms a third outlet 1121 on the outer surface of the wall of the connecting part 10. The connecting part 10 has a mounting seat, and the mounting seat is communicated with the first channel 111 or the second channel 112. This allows components in the thermal management system to be located on the mounting seat, where the components include valve components and sensors, etc. The valve components may include a first valve part, a second valve part, a first one-way valve, and a second one-way valve. The sensors may include a first temperature sensor and a second temperature sensor. In the technical solution of the present application, the connecting part 10 provides multiple connecting ports and a mounting seat for the assembly of the integrated component with the vehicle thermal management system, and the connecting part 10 is assembled with the liquid storage part to realize the liquid storage function, which facilitates the assembly of the integrated component and simplifies the assembly process. In addition, the structure of the integrated component is simple and compact, and no additional connecting pipe is required. In the following embodiments, the above multiple connecting ports include the first inlet 1111, the first outlet 1112, and further include a second inlet, a third outlet 1121, a third inlet, and a second outlet 1113 which are described below. The mounting seat may include a first mounting seat 41 and a second mounting seat 42. The first inlet 1111 may be connected to an outlet of a compressor in the thermal management system, the first outlet 1112 may be connected to an inlet of an indoor condenser, the second inlet may be connected to an outlet of the indoor condenser, and the third outlet 1121 may be connected to an inlet of an intermediate heat exchanger. During the process of connecting with the system, the connecting part 10 can provide connection support. For example, a stud is provided at the connecting port position, one end of the stud is fixed to the connecting part 10, and the other end of the stud protrudes from the surface of the connecting part 10, so as to facilitate the connection with the pipeline of the system. The connecting part 10 may include two limiting parts 1100. The first outlet 1112 and the second outlet 1113 are respectively formed on the limiting parts 1100, and the limiting parts 1100 can support and limit the valve core 72 of the valve part.

The first embodiment of the integrated component is shown in FIG. 1 to FIG. 12. In this embodiment, the integrated component 100 includes a first valve part 70, a second valve part 80, a connecting part 10 and a liquid storage part 20. The connecting part 10 has a channel, and the channel includes a first channel 111 and a second channel 112. The first channel 111 and the second channel 112 are independently arranged. The integrated component 100 has a liquid storage cavity 30. The first channel 111 is formed with a first inlet 1111, a first outlet 1112 and a second outlet 1113 on the outer surface of the wall of the connecting part 10. The working medium enters the first channel 111 from the first inlet 1111, and leaves the first channel 111 through the first outlet 1112 and the second outlet 1113. The liquid storage cavity 30 can directly communicate with the second channel 112. The second channel 112 forms a third outlet 1121 on the outer surface of the wall of the connecting part 10. The connecting part 10 has a mounting seat, and the mounting seat includes a first mounting seat 41 and a second mounting seat 42. Both the first mounting seat 41 and the second mounting seat 42 communicate with the first channel 111, or in other words, part of the first valve part 70 is located on the first mounting seat 41 and is fixedly connected to the connecting part 10, and part of the second valve part 80 is located on the second mounting seat 42 and is fixedly connected to the connecting part 10. The first valve part 70 and the second valve part 80 are two-way valves. The pressure of the working medium between the first inlet 1111 and the first outlet 1112 can be changed by controlling the first valve part 70; and the pressure of the working medium between the first inlet 1111 and the second outlet 1113 can be changed by controlling the second valve part 80. The integrated component may include only one valve part, that is, the first valve part 70 and the second valve part 80 are provided as a whole, the valve part is a three-way valve, at least part of the valve part is located on the mounting seat and between the first outlet 1112 and the second outlet 1113, and the pressure of the working medium in the first channel 111 can be changed by controlling the valve part.

In conjunction with FIG. 3 to FIG. 12, in this embodiment, the integrated component 10 further includes one-way valves and a temperature sensor. The number of the one-way valves is two, namely the first one-way valve 51 and the second one-way valve 52. In this embodiment, the temperature sensor is a first temperature sensor 61.

The connecting part 10 has a third channel 113 and a fourth channel 114. The second inlet 1131 is an opening formed by the third channel 113 on the surface of the wall of the connecting part 10. The working medium enters the third channel 113 through the second inlet 1131, and the third channel 113 communicates with the inlet of the liquid storage cavity 30. The whole first one-way valve 51 is located in the third channel 113, and the first one-way valve 51 is connected to the connecting part 10 in a position-limited manner. The first one-way valve 51 can prevent the working medium from flowing backward from the liquid storage cavity 30 to the second inlet 1131. The whole second one-way valve 52 is located in the fourth channel 114. The third inlet 1141 is an opening formed by the fourth channel 114 on the surface of the wall of the connecting part 10, and the working medium enters the fourth channel 114 through the third inlet 1141. The fourth channel 114 is communicated with the inlet of the liquid storage cavity 30, and the second one-way valve 52 can prevent the working medium from flowing backward from the liquid storage cavity 30 to the third inlet 1141.

A sensing head of the first temperature sensor 61 is located in the third channel 113. The first temperature sensor 61 is fixedly connected to the connecting part 10. The sensing head of the first temperature sensor 61 is located between the second inlet 1131 and the first one-way valve 51. The first temperature sensor can detect the temperature of the working medium entering the liquid storage cavity.

In order to facilitate the assembly and connection of the integrated component with the system, the first inlet 1111 and the third outlet 1121 are located on a same side of the connecting part 10. Specifically, the first inlet 1111 and the third outlet 1121 are located at the top of the connecting part 10 and between the first valve part 70 and the second valve part 80. The first outlet 1112 and the second inlet 1131 are located on a same side of the side wall of the connecting part 10. The third inlet 1141 and the second outlet 1113 are located on a same side of the side wall of the connecting part 10. In this way, the connecting ports of the integrated component are arranged in pairs, which is conducive to the connection of the joints of the thermal management system in pairs and facilitates assembly.

Figure 5:
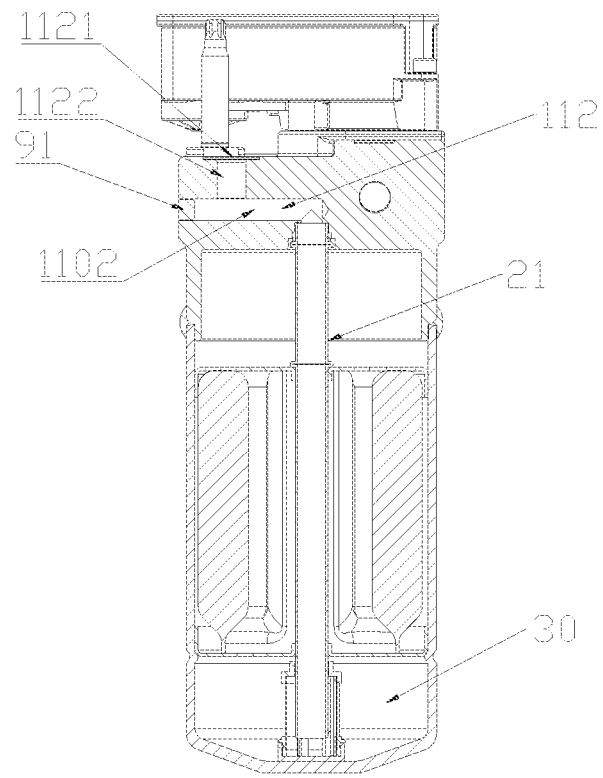
FIG. 5 is a cross-sectional view of the integrated component of FIG. 2 taken along line H-H.
Figure 12:
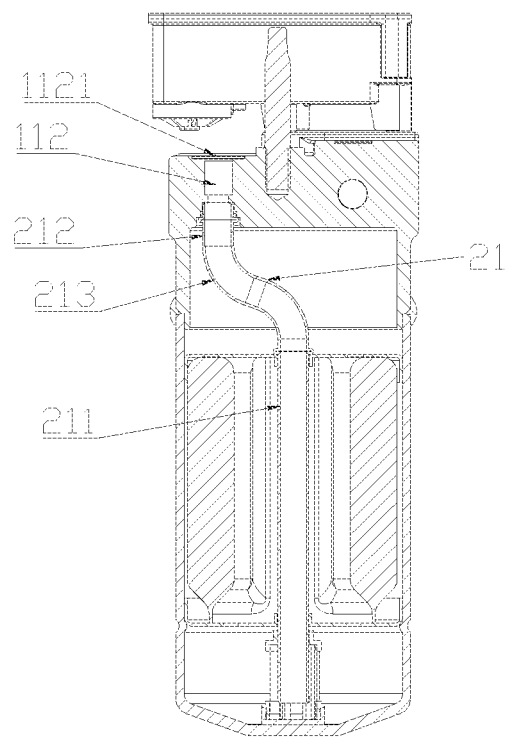
FIG. 12 is a schematic structural view of another embodiment of the integrated component shown in FIG. 5.
Figure 13:
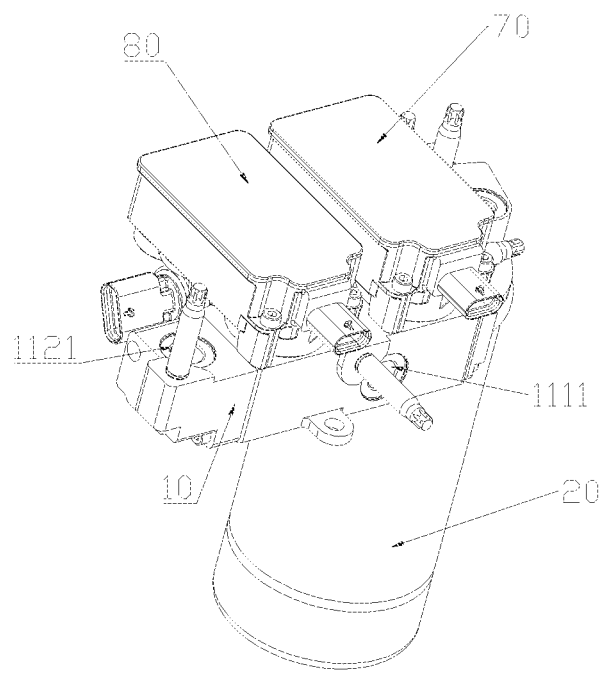
FIG. 13 is a perspective view of a second embodiment of the integrated component according to the present application.
Figure 14:
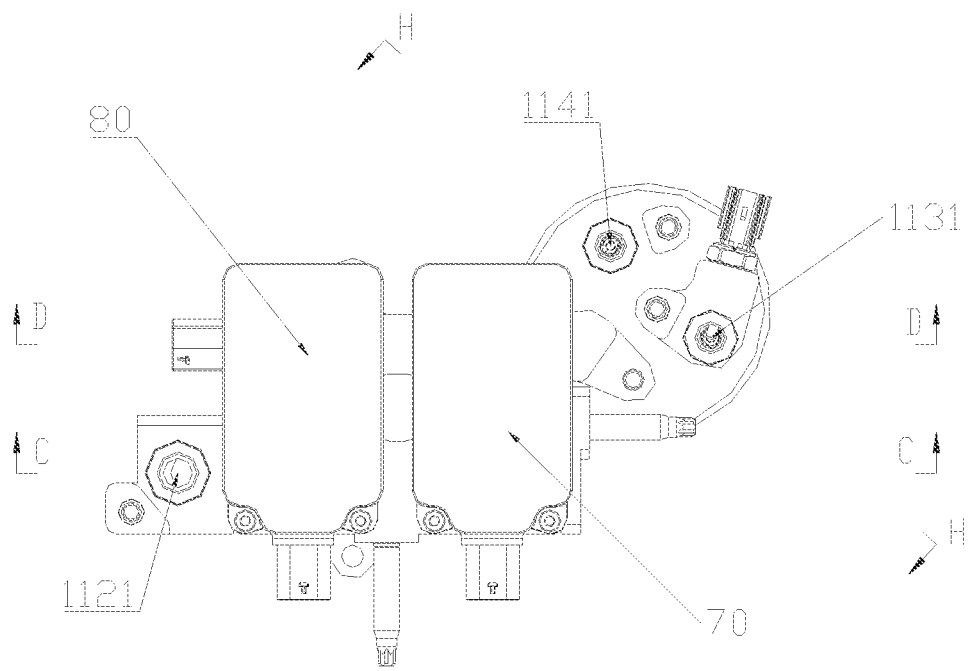
FIG. 14 is a top view of the integrated component of FIG. 13.
Figure 15:
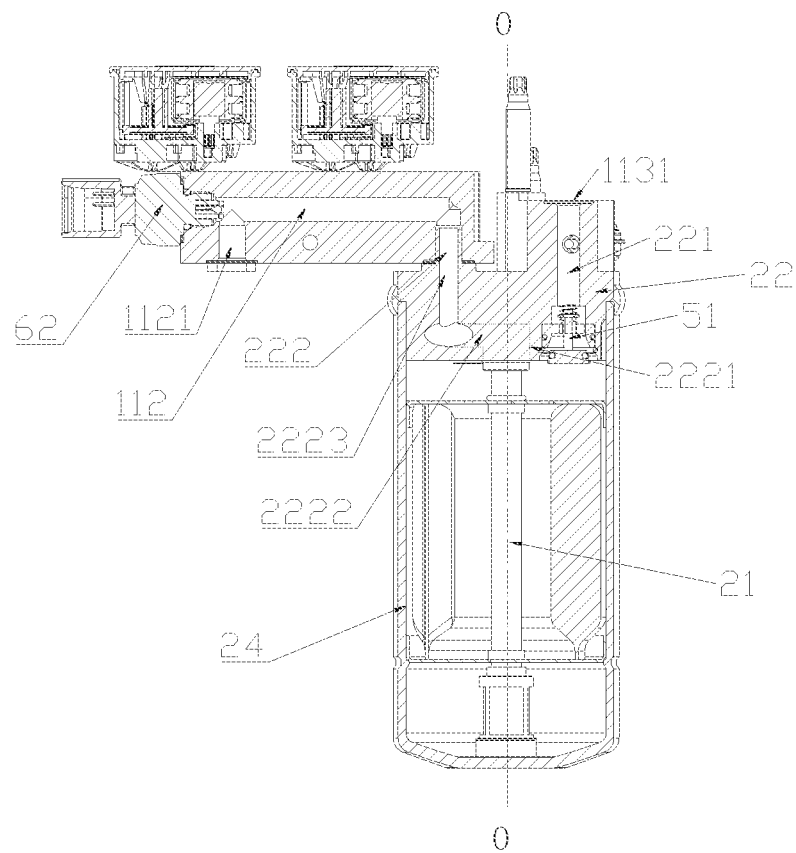
FIG. 15 is a cross-sectional view of the integrated component of FIG. 13 taken along line D-D.
Figure 16:
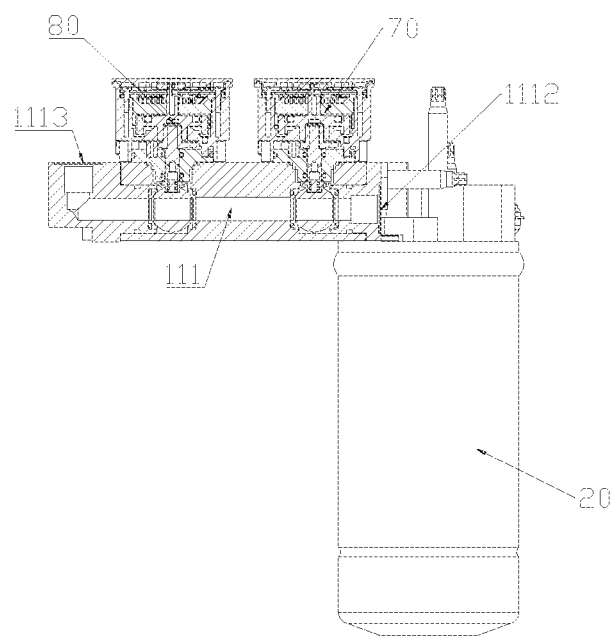
FIG. 16 is a cross-sectional view of the integrated component of FIG. 13 taken along line C-C.
Figure 17:
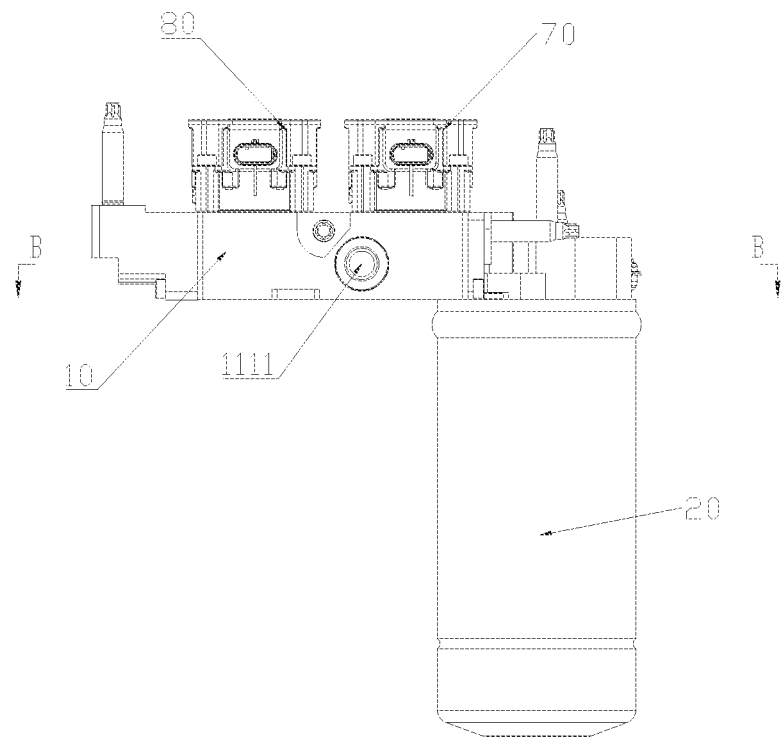
FIG. 17 is a front view of the integrated component of FIG. 13.
Figure 18:
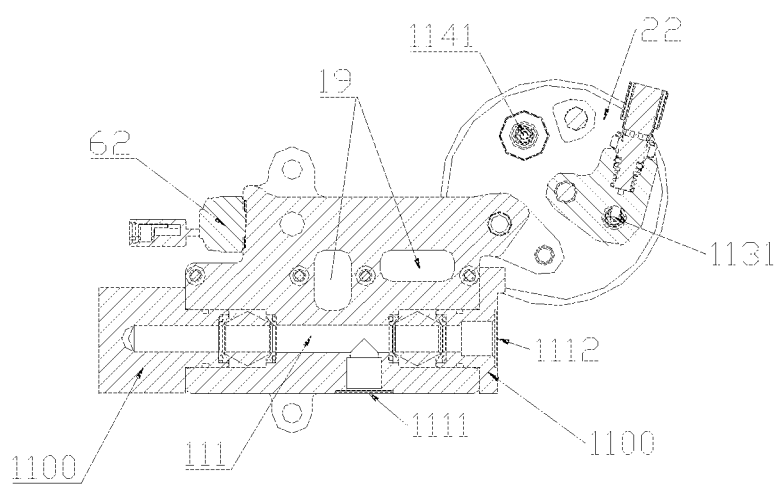
FIG. 18 is a cross-sectional view of the integrated component of FIG. 10 taken along line B-B.
Figure 19:
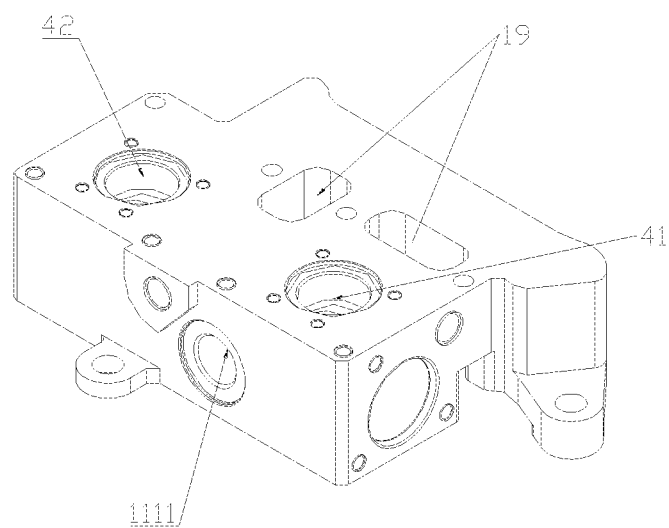
FIG. 19 is a perspective view of the connecting part in FIG. 13.
Figure 20:
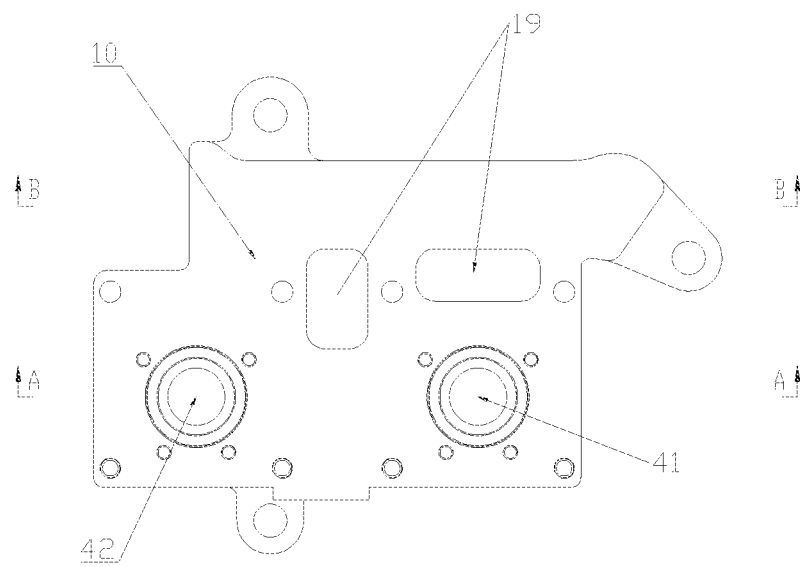
FIG. 20 is a top view of the connecting part of FIG. 19.
Figure 21:
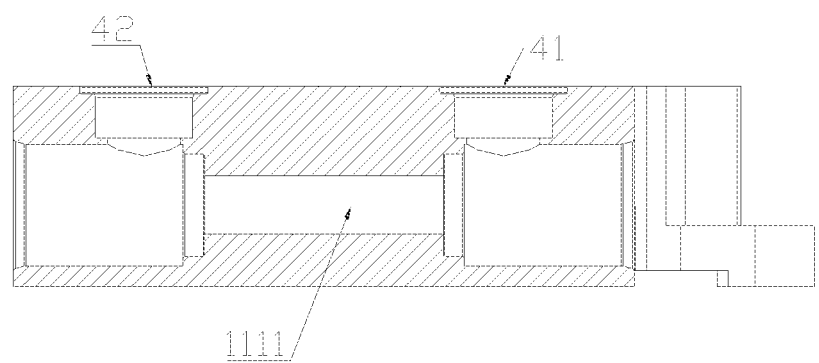
FIG. 21 is a cross-sectional view of the connecting part of FIG. 20 taken along line A-A.
Figure 22:
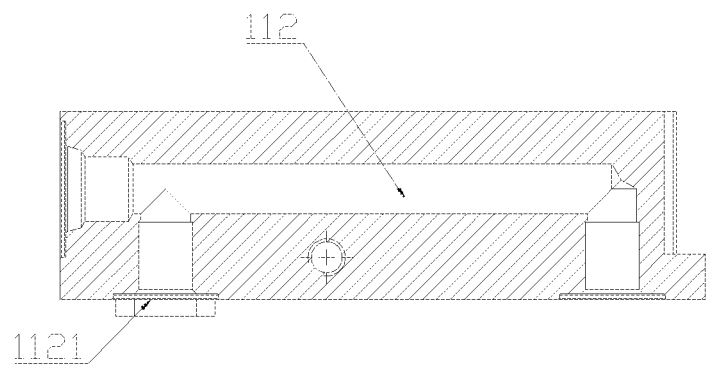
FIG. 22 is a cross-sectional view of the connecting part of FIG. 20 taken along line B-B.
Figure 23:
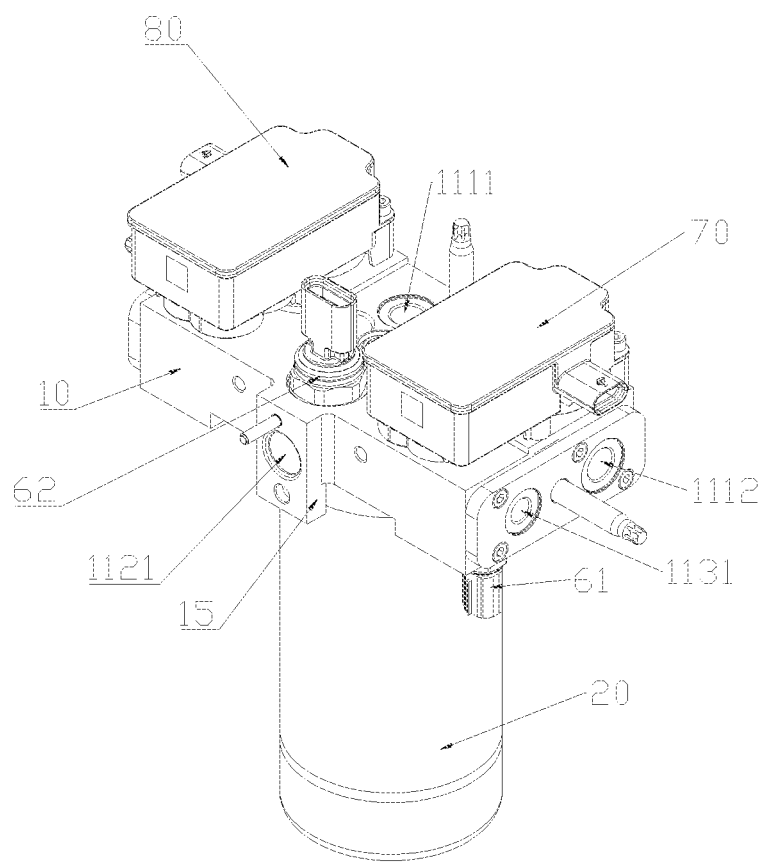
FIG. 23 is a perspective view of a third embodiment of the integrated component according to the present application.
Figure 24:
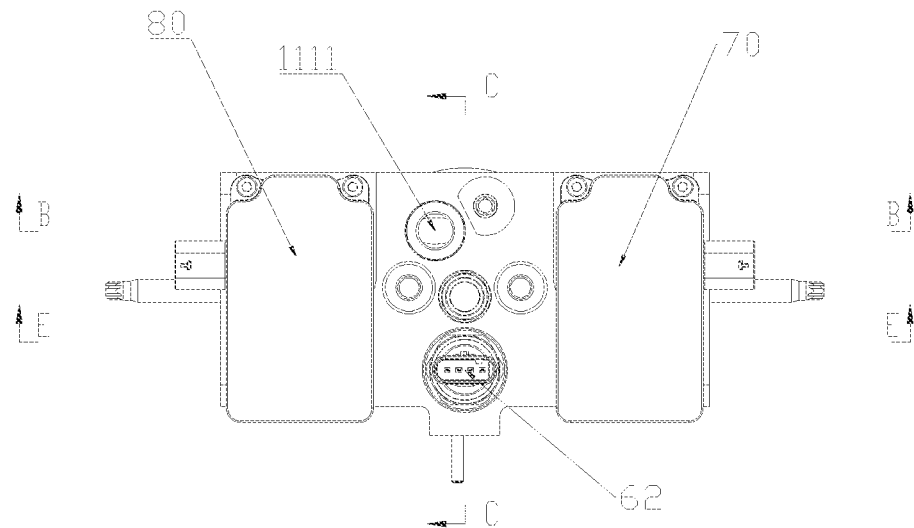
FIG. 24 is a top view of the integrated component of FIG. 23.
Figure 25:
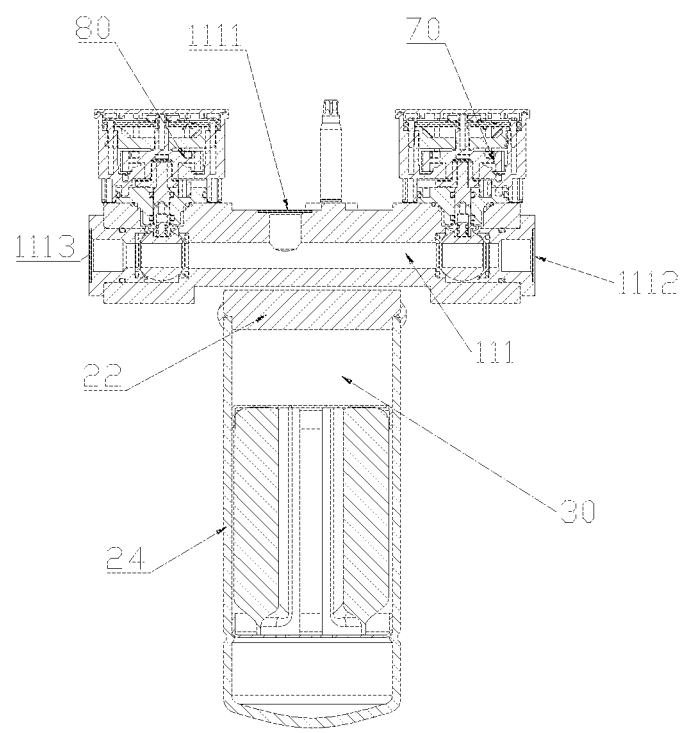
FIG. 25 is a cross-sectional view of the integrated component of FIG. 24 taken along line B-B.
Figure 26:
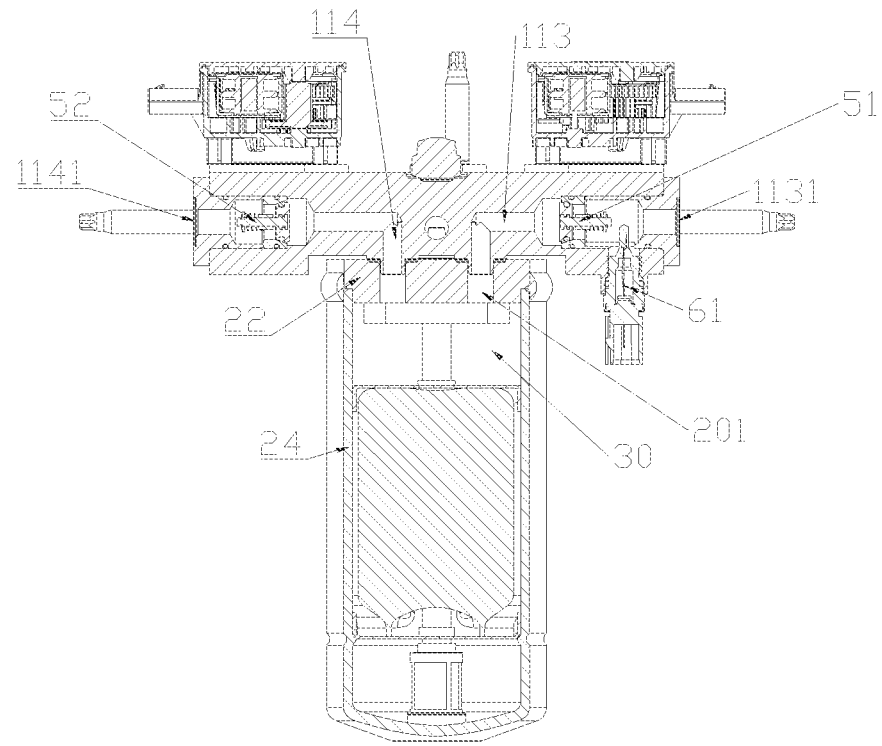
FIG. 26 is a cross-sectional view of the integrated component of FIG. 24 taken along line E-E.

Referring to FIG. 5 and FIG. 12, the liquid storage part 20 includes a liquid collecting pipe 21. In FIG. 5, the liquid collecting pipe 21 is coaxial with the liquid storage cavity 30. The liquid collecting pipe 21 communicates the liquid storage cavity 30 with the second channel 112. The second channel 112 includes a first section 1102 and a second section 1122. The first section 1102 and the second section 1122 are arranged to intersect, or in other words, the first section 1102 and the second section 1122 communicate with each other. The first section 1102 is perpendicular to the liquid collecting pipe 21, and the second section 1122 is parallel to the liquid collecting pipe 21. In this embodiment, the structure of the liquid collecting pipe 21 is relatively simple, while the structure of the second channel 112 is relatively complicated. In this embodiment, the connecting part 10 may be processed from a profile. In order to process the first section 1102, the first section 1102 is communicated with the outer periphery of the connecting part 10. In order to prevent leakage of the working medium, the first section 1102 is provided with a plug 91.

Referring to FIG. 12, the liquid collecting pipe 21 includes a first sub-part 211, a second sub-part 212 and a transition section 213. The first sub-part 211 and the second sub-part 212 are arranged in parallel, and are connected by the transition section 213. The first sub-part 211 is coaxial with the liquid storage cavity 30. The liquid collecting pipe 21 communicates the liquid storage cavity 30 with the second channel 112. The second channel 112 is coaxial with the second sub-part 212 of the liquid collecting pipe.

Figure 3:
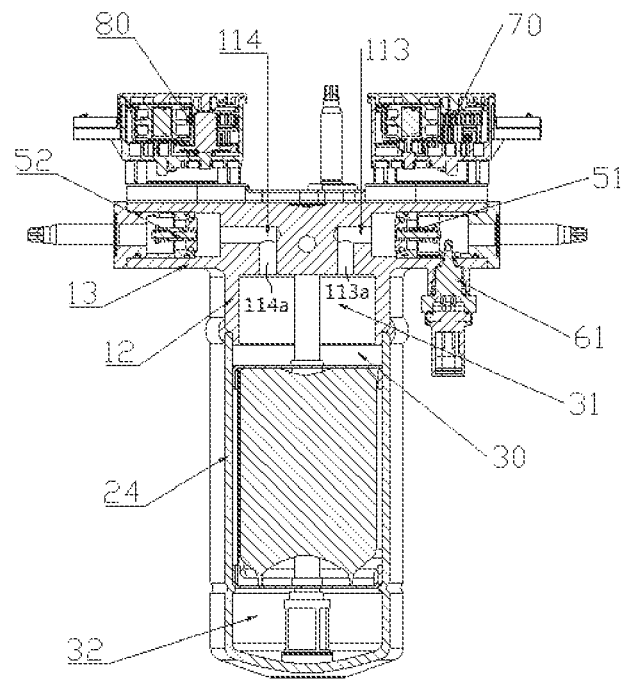
FIG. 3 is a cross-sectional view of the integrated component of FIG. 2 taken along line I-I.
Figure 4:
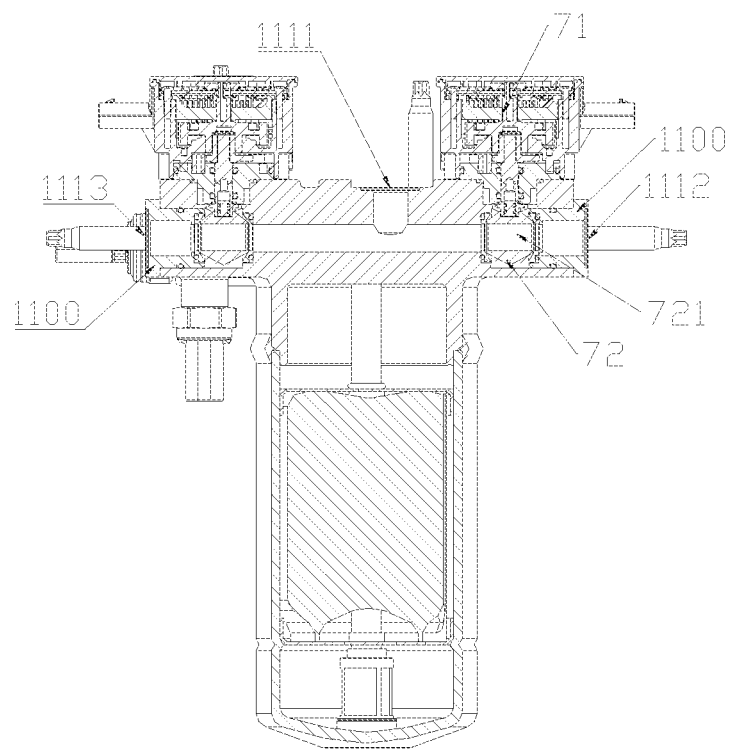
FIG. 4 is a cross-sectional view of the integrated component of FIG. 2 taken along line A-A.
Figure 6:
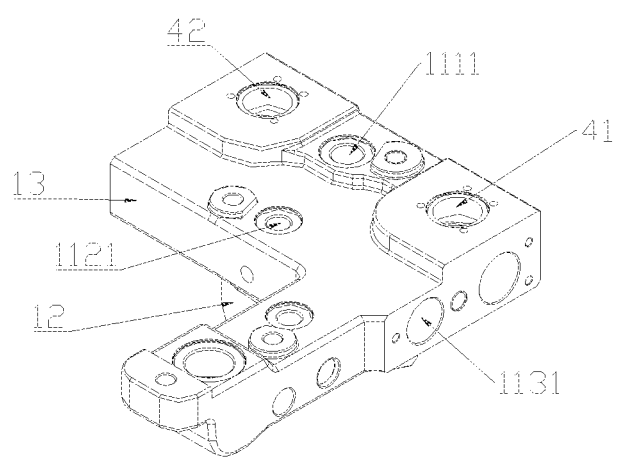
FIG. 6 is a perspective view of a connecting part in FIG. 1.
Figure 7:
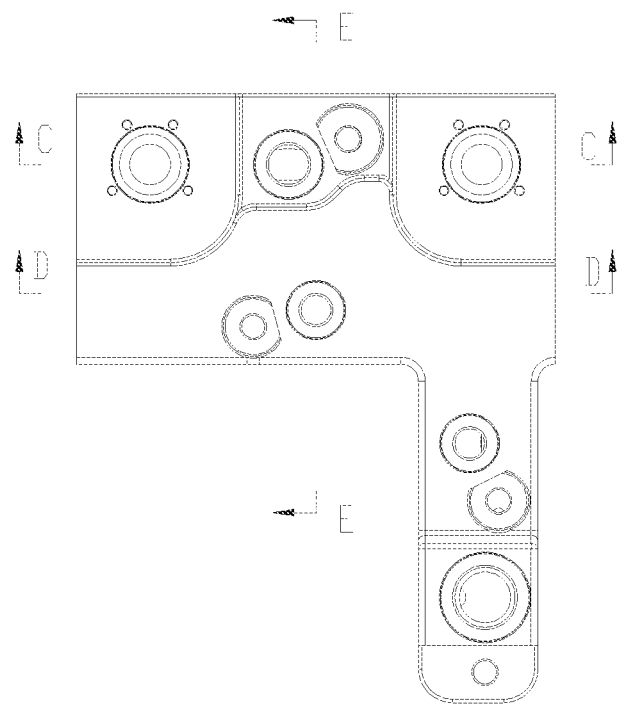
FIG. 7 is a top view of the connecting part of FIG. 6.

In combination with FIG. 3 and FIG. 6, the connecting part 10 includes a cylindrical part 12 and a main body part 13. The main body part 13 has the above channels, and the cylindrical part 12 extends downward from the main body part 13. The liquid storage part 20 has a casing 24, and the casing 24 is sealed to the cylindrical part 12 by welding. The inner circumference of the cylindrical part 12 forms the first portion 31 of the liquid storage cavity 30, and the casing 24 forms the second portion 32 of the liquid storage cavity 30. The welding seam between the casing 24 and the cylindrical part 12 is at a predetermined distance from the main body part 13, so that the influence of the heat of welding on the mounting components of the connecting part 10 can be avoided, where the mounting components include the first one-way valve, a second one-way valve and the first temperature sensor. The inlets formed by the third channel 113 and the fourth channel 114 at the liquid storage cavity 30 are located between the central axis of the liquid storage cavity 30 and the inner wall of the cylindrical part 12. Specifically, the inlets 113a and 114a formed by the third channel 113 and the fourth channel 114 at the liquid storage cavity 30 are located at the middle position between the central axis of the liquid storage cavity 30 and the inner wall of the cylindrical part 12.

Figure 8:
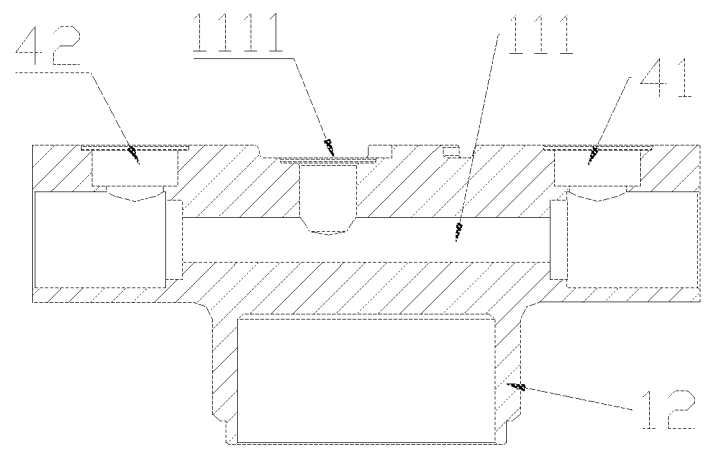
FIG. 8 is a cross-sectional view of the connecting part of FIG. 7 taken along line C-C.
Figure 9:
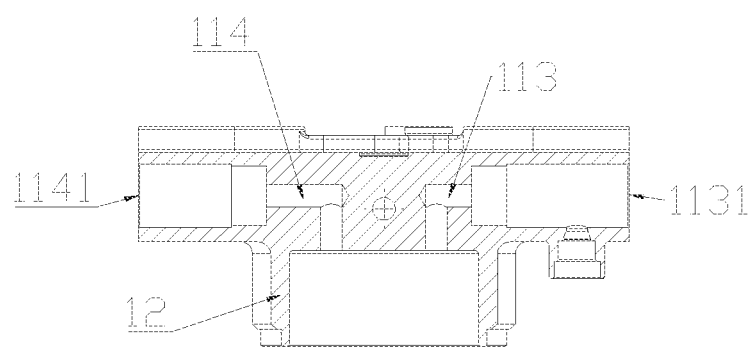
FIG. 9 is a cross-sectional view of the connecting part of FIG. 7 taken along line D-D.
Figure 10:
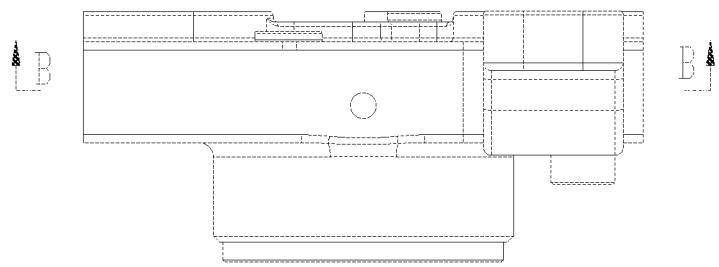
FIG. 10 is a front view of the connecting part of FIG. 6.
Figure 11:
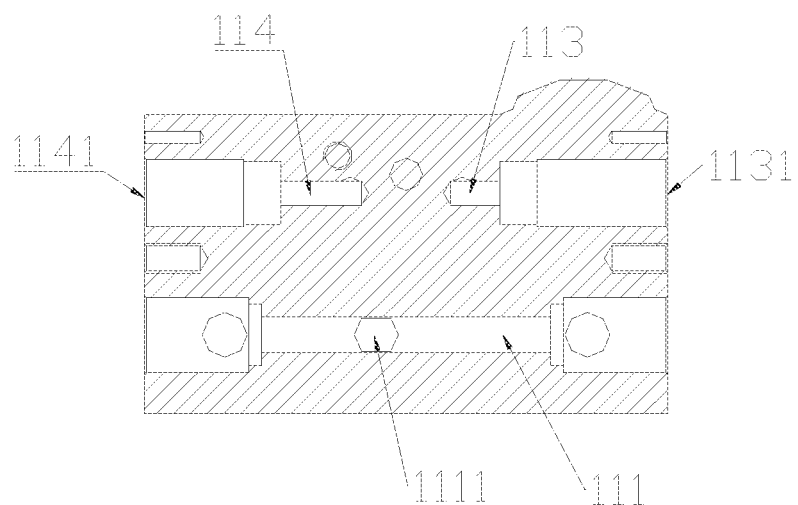
FIG. 11 is a cross-sectional view of the connecting part of FIG. 10 taken along line B-B.

In combination with FIG. 3 and FIG. 8, the first channel 111 is not in communication with the first portion of the liquid storage cavity 30 formed by the cylindrical part 12. In combination with FIG. 3 and FIG. 9, the working medium can enter the cylindrical part 12 from the second inlet 1131 and through the third channel 113 to form the first portion 31 of the liquid storage cavity 30; and, the working medium can enter the cylindrical part 12 from the third inlet 1141 and through the fourth channel 114 to form the second portion 32 of the liquid storage cavity 30. Referring to FIG. 11, the central axes of the first channel 111, the third channel 113 and the fourth channel 114 are located on the same horizontal plane of the connecting part 10. The horizontal plane may be a section as shown in FIG. 11, which is beneficial to using the same machining reference.

In this embodiment, the first valve part 70 and the second valve part 80 each include a driving part 71 and a valve core 72. The valve core 72 is spherical, and the valve core 72 has a valve core channel 721. The driving part 71 drives the valve core 72 to rotate, and the valve core channel 721 allows the first channel 111 to communicate. It is also applicable to adjust the pressure of the working medium in the first channel 111 by adjusting the flow area of the valve core channel 721 and the first channel 111. Of course, the on-off state of the first channel 111 can also be adjusted. Only one valve part may be provided, and the only one valve part may be a three-way ball valve.

The second embodiment of the integrated component is shown in FIG. 13 to FIG. 22. Compared with the first embodiment, the main differences are: the liquid storage part 20 further includes a cover body 22, and the casing 24 is sealingly connected with the cover body 22. The liquid storage cavity 30 is located between the casing 24 and the cover body 22. The connecting part 10 is sealingly connected with the cover body 22. The cover body 22 has a first inlet passage 221 and an outlet passage 222. The liquid storage cavity 30 can communicate with the second channel 112 through the outlet passage 222. The second inlet 1131 is an opening formed by the first inlet passage 221 on an upper surface of the cover body 22. The cover body 22 is further provided with a second inlet passage (not shown in the figure), the second inlet passage has the same structure as the first inlet passage 221. The third inlet 1141 is an opening formed by the second inlet passage on the upper surface of the cover body 22.

In this embodiment, the cover body 22 is positioned to the connecting part 10 by inserting, and is fixed thereto by welding after positioning. The connecting part 10 is located on one side of the central axis O-O of the liquid storage cavity 30. The outlet passage 222 includes a first subsection 2221, a second subsection 2222 and a third subsection 2223. The first subsection 2221 communicates with the liquid storage cavity 30, and the second subsection 2222 is located between the first subsection 2221 and the third subsection 2223. The central axis of the first subsection 2221 is coaxial with the central axis O-O of the liquid storage cavity 30. The central axis of the third subsection 2223 is parallel to the central axis of the liquid storage cavity 30. The central axis of the second subsection 2222 is perpendicular to the central axis of the liquid storage cavity 30. Due to the limitation of the position of the cross-section in FIG. 15, the first subsection 2221 and the second subsection 2222 are denoted with dotted lines. The cover body 22 is formed by a profile, the liquid collecting pipe 21 has a simple structure, and the combination and processing of the cover body and the liquid collecting pipe are relatively easy.

The first one-way valve 51 is located in the first inlet passage 221 and connected to the cover body 22 in a position-limited manner. The first inlet passage 221 is communicated with the liquid storage cavity 30. The cover body 22 is further provided with a second inlet passage. The second one-way valve (not shown in the figure) is located in the second inlet passage and is connected with the cover body 22 in a position-limited manner. The second inlet passage is communicated with the liquid storage cavity 30.

In this embodiment, the temperature sensor is a second temperature sensor 62. The sensing head of the second temperature sensor 62 is located in the second channel 112. The second temperature sensor 62 is fixedly connected to the connecting part 10. Specifically, the sensing head of the second temperature sensor 62 is adjacent to the third outlet 1121. The second temperature sensor can detect the temperature of the working medium at the outlet of the liquid storage cavity.

Referring to FIG. 15 to FIG. 22, the connecting part 10 has a first inlet 1111, a first channel 111, a second channel 112, a first mounting seat 41 and a second mounting seat 42. The first channel 111 includes a first outlet 1112 and a second outlet 1113. The second channel 112 includes a third outlet 1121. A second inlet 1131 and a third inlet 1141 are located on the cover body 22. The working medium enters the first channel 111 from the first inlet 1111, and leaves the first channel 111 through the first outlet 1112 and the second outlet 1113. A first valve part 70 is located on the first mounting seat 41, and a second valve part 80 is located on the second mounting seat 42. The pressure of the working medium between the first inlet 1111 and the first outlet 1112 can be changed by controlling the first valve part 70. The pressure of the working medium between the first inlet 1111 and the second outlet 1112 can be changed by controlling the second valve part 8. The working medium enters the liquid storage cavity 30 from the second inlet 1131 and the third inlet 1141. The working medium in the liquid storage cavity 30 enters the second channel 112 through the liquid collecting pipe 21 and the outlet passage 222, and leaves the second channel 112 through the third outlet 1121.

In order to reduce weight, the connecting part 10 is provided with a hollow part 19 between the second channel 112 and the first channel 111 and between the second channel 112 and the mounting seat.

Figure 27:
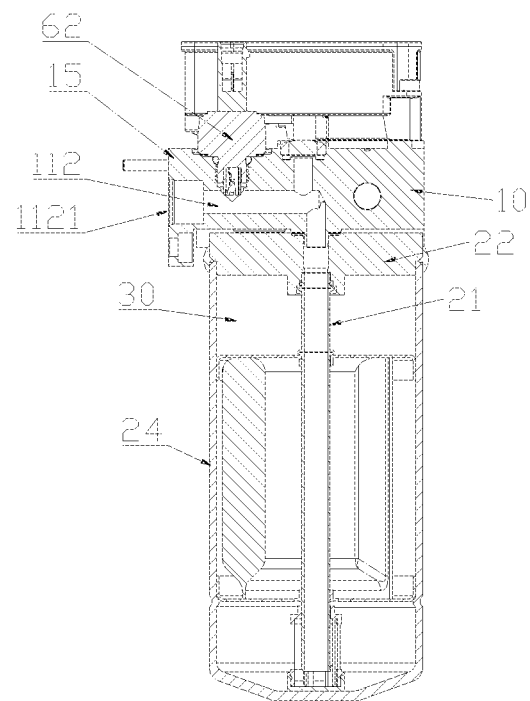
FIG. 27 is a cross-sectional view of the integrated component of FIG. 24 taken along line C-C.
Figure 28:
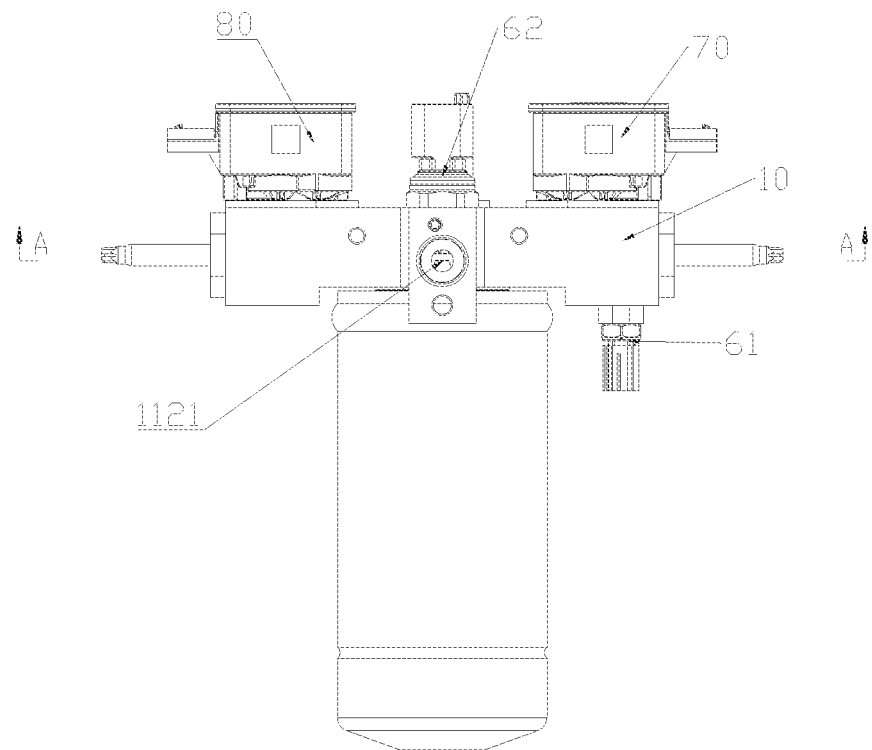
FIG. 28 is a front view of the integrated component of FIG. 23.
Figure 29:
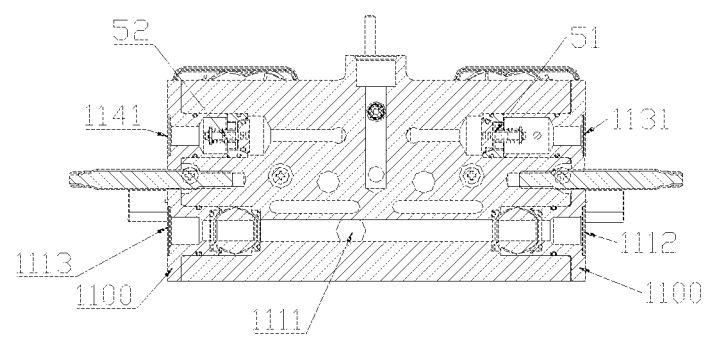
FIG. 29 is a cross-sectional view of the integrated component of FIG. 28 taken along line A-A.

The third embodiment of the integrated component is shown in FIG. 23 to FIG. 29. Compared with the first embodiment, the main differences are: the liquid storage part 20 further includes a cover body 22, and a casing 24 is sealingly connected with the cover body 22. The liquid storage cavity 30 is located between the casing 24 and the cover body 22, and the connecting part 10 is sealingly connected with the cover body 22. The connecting part 10 is positioned to the cover body 22 by snapping, and is fixed thereto by welding. The cover body 22 has a through hole 201. The third channel 113 and the fourth channel 114 communicate with the liquid storage cavity 30 through the through hole 201. In this embodiment, the sensors include a first temperature sensor 61 and a second temperature sensor 62. The sensing head of the first temperature sensor 61 is located in the third channel 113. The first temperature sensor 61 is fixedly connected to the connecting part 10. The sensing head of the first temperature sensor 61 is located between the second inlet 1131 and the first one-way valve. The sensing head of the second temperature sensor 62 is located in the second channel 112. The second temperature sensor 62 is fixedly connected to the connecting part 10. Specifically, the sensing head of the second temperature sensor 62 is adjacent to the third outlet 1121. In addition, in this embodiment, the third outlet 1121 is located on the peripheral side of the connecting part 10. Referring to FIG. 27, the connecting part 10 includes a protrusion 15, and the third outlet 1121 is located on the protrusion. In other words, the second channel 112 forms the third outlet 1121 on the outer surface of the protrusion 15, so that the second channel can cooperate with other components of the system through the protrusion, and the positioning is more accurate.

It should be noted that, The above embodiments are only intended to illustrate the present application rather than limit the technical solutions described in the present application. Although the present specification has been described in detail with reference to the embodiments described above, it should be understood by those skilled in the art that, various modifications or equivalent substitutions can be made to the technical solutions of the present application by those skilled in the art, and all technical solutions and improvements that do not depart from the spirit and scope of the present application should be included within the scope of the claims of the present application.

The invention claimed is:

1. An integrated component, adapted to be arranged in a vehicle thermal management system, wherein the integrated component comprises a connecting part and a liquid storage part, wherein the connecting part and the liquid storage part are connected as a whole, wherein the integrated component has a liquid storage cavity, wherein the connecting part has a channel, and the channel comprises a first channel and a second channel, wherein the first channel and the second channel are independently arranged, wherein the first channel is not in communication with the liquid storage cavity and comprises a first inlet, a first outlet, and/or a second outlet, wherein a working medium enters the first channel from the first inlet, and at least part of the working medium leaves the first channel through the first outlet and/or the second outlet; the liquid storage cavity is in communication with the second channel, wherein the second channel comprises a third outlet, and the working medium passing through the liquid storage cavity leaves the second channel through the third outlet; the connecting part has a mounting seat, wherein the mounting seat is in communication with the first channel or the second channel, so that components in the thermal management system are able to be positioned on the mounting seat.

2. The integrated component according to claim 1, wherein the connecting part comprises a cylindrical part and a main body part, wherein the main body part has the channels, and the cylindrical part extends downward from the main body part, wherein the liquid storage part has a casing, and the casing is sealed to the cylindrical part by welding, wherein an inner cavity of the cylindrical part forms a first portion of the liquid storage cavity, and an inner cavity of the casing forms a second portion of the liquid storage cavity; or, the liquid storage part comprises a casing and a cover body, and the casing is sealingly connected with the cover body, wherein the liquid storage cavity is located between the casing and the cover body, and the connecting part is sealingly connected with the cover body, wherein the cover body has a first inlet passage and an outlet passage, wherein the liquid storage cavity is in communication with the second channel through the outlet passage, wherein an opening formed by the first inlet passage on an upper surface of the cover body is a second inlet.

3. The integrated component according to claim 2, wherein the connecting part has a third channel, and the integrated component has the second inlet, wherein the second inlet is an opening formed by the third channel on a surface of a wall of the connecting part, wherein the working medium enters the third channel through the second inlet, and the third channel is in communication with an inlet of the liquid storage cavity; wherein the components comprise a first one-way valve, and the whole first check valve is located in the third channel, wherein the first one-way valve is fixedly connected with the connecting part, and the first one-way valve is configured to prevent the working medium from flowing from the liquid storage cavity toward the second inlet.

4. The integrated component according to claim 3, wherein the components comprise a second one-way valve, the connecting part has a fourth channel, and the whole second one-way valve is located in the fourth channel, wherein the integrated component has a third inlet, wherein the third inlet is an opening formed by the fourth channel on the surface of the wall of the connecting part, wherein the working medium enters the fourth channel through the third inlet, and the fourth channel is in communication with the inlet of the liquid storage cavity, wherein the second one-way valve is configured to prevent the working medium from flowing from the liquid storage cavity toward the third inlet.

5. The integrated component according to claim 4, wherein the components further comprise a first temperature sensor; wherein a sensing head of the first temperature sensor is located in the third channel, and the first temperature sensor is fixedly connected with the connecting part; and/or,
the integrated component further comprises a second temperature sensor, wherein a sensing head of the second temperature sensor is located in the second channel, and the second temperature sensor is fixedly connected with the connecting part.

6. The integrated component according to claim 5, wherein the liquid storage part comprises a liquid collecting pipe, wherein the liquid collecting pipe is coaxial with the liquid storage cavity, wherein the liquid collecting pipe is configured to communicate the liquid storage cavity with the second channel or the outlet passage, wherein the second channel comprises a first section and a second section, and the first section and the second section are arranged to intersect each other, wherein the first section is perpendicular to the liquid collecting pipe, and the second section is parallel to the liquid collecting pipe; or,
the liquid storage part comprises a liquid collecting pipe, wherein the liquid collecting pipe comprises a first sub-part, a second sub-part and a transition section, wherein the first sub-part and the second sub-part are arranged in parallel, and are connected by the transition section, wherein the first sub-part is coaxial with the liquid storage cavity, wherein the liquid collecting pipe is configured to communicate the liquid storage cavity with the second channel, wherein the second channel is coaxial with the second sub-part of the liquid collecting pipe.

7. The integrated component according to claim 6, wherein the components comprise a valve part, and the valve part is a three-way valve, wherein the second outlet is an opening formed by the first channel on an outer surface of the wall of the connecting part, at least part of the valve part is located on the mounting seat and between the first outlet and the second outlet, wherein a pressure of the working medium in the first channel is changed by controlling the valve part; or,
the components comprise a first valve part and a second valve part, wherein the first valve part and the second valve part are two-way valves, wherein the mounting seat has a first mounting seat and a second mounting seat, wherein at least part of the first valve part is located on the first mounting seat and between the first inlet and the first outlet, wherein the pressure of the working medium between the first inlet and the first outlet is changed by controlling the first valve part; wherein the connecting part is further provided with a third inlet and a second outlet, wherein the second outlet is an opening formed by the first channel on the outer surface of the wall of the connecting part, wherein at least part of the second valve part is located on the second mounting seat and between the first inlet and the second outlet, wherein the pressure of the working medium between the first inlet and the second outlet is changed by controlling the second valve part.

8. The integrated component according to claim 5, wherein the components comprise a valve part, and the valve part is a three-way valve, wherein the second outlet is an opening formed by the first channel on an outer surface of the wall of the connecting part, at least part of the valve part is located on the mounting seat and between the first outlet and the second outlet, wherein a pressure of the working medium in the first channel is changed by controlling the valve part; or,
the components comprise a first valve part and a second valve part, wherein the first valve part and the second valve part are two-way valves, wherein the mounting seat has a first mounting seat and a second mounting seat, wherein at least part of the first valve part is located on the first mounting seat and between the first inlet and the first outlet, wherein the pressure of the working medium between the first inlet and the first outlet is changed by controlling the first valve part; wherein the connecting part is further provided with a third inlet and a second outlet, wherein the second outlet is an opening formed by the first channel on the outer surface of the wall of the connecting part, wherein at least part of the second valve part is located on the second mounting seat and between the first inlet and the second outlet, wherein the pressure of the working medium between the first inlet and the second outlet is changed by controlling the second valve part.

9. The integrated component according to claim 4, wherein the components comprise a valve part, and the valve part is a three-way valve, wherein the second outlet is an opening formed by the first channel on an outer surface of the wall of the connecting part, at least part of the valve part is located on the mounting seat and between the first outlet and the second outlet, wherein a pressure of the working medium in the first channel is changed by controlling the valve part; or,
the components comprise a first valve part and a second valve part, wherein the first valve part and the second valve part are two-way valves, wherein the mounting seat has a first mounting seat and a second mounting seat, wherein at least part of the first valve part is located on the first mounting seat and between the first inlet and the first outlet, wherein the pressure of the working medium between the first inlet and the first outlet is changed by controlling the first valve part; wherein the connecting part is further provided with a third inlet and a second outlet, wherein the second outlet is an opening formed by the first channel on the outer surface of the wall of the connecting part, wherein at least part of the second valve part is located on the second mounting seat and between the first inlet and the second outlet, wherein the pressure of the working medium between the first inlet and the second outlet is changed by controlling the second valve part.

10. The integrated component according to claim 3, wherein the components comprise a valve part, and the valve part is a three-way valve, wherein the second outlet is an opening formed by the first channel on an outer surface of the wall of the connecting part, at least part of the valve part is located on the mounting seat and between the first outlet and the second outlet, wherein a pressure of the working medium in the first channel is changed by controlling the valve part; or, the components comprise a first valve part and a second valve part, wherein the first valve part and the second valve part are two-way valves, wherein the mounting seat has a first mounting seat and a second mounting seat, wherein at least part of the first valve part is located on the first mounting seat and between the first inlet and the first outlet, wherein the pressure of the working medium between the first inlet and the first outlet is changed by controlling the first valve part; wherein the connecting part is further provided with a third inlet and a second outlet, wherein the second outlet is an opening formed by the first channel on the outer surface of the wall of the connecting part, wherein at least part of the second valve part is located on the second mounting seat and between the first inlet and the second outlet, wherein the pressure of the working medium between the first inlet and the second outlet is changed by controlling the second valve part.

11. The integrated component according to claim 2, wherein the cover body is positioned to the connecting part by inserting, and the connecting part is located on one side of a central axis of the liquid storage cavity, wherein the outlet passage comprises a first subsection, a second subsection and a third subsection, wherein the first subsection is in communication with the liquid storage cavity, and the second subsection is located between the first subsection and the third subsection, wherein a central axis of the first subsection is coaxial with the central axis of the liquid storage cavity, wherein a central axis of the third subsection is parallel to the central axis of the liquid storage cavity, wherein a central axis of the second subsection is perpendicular to the central axis of the liquid storage cavity.

12. The integrated component according to claim 11, wherein the components comprise a first valve part and a second valve part, wherein the first valve part and the second valve part are two-way valves, wherein the mounting seat has a first mounting seat and a second mounting seat, wherein at least part of the first valve part is located on the first mounting seat and between the first inlet and the first outlet, wherein the pressure of the working medium between the first inlet and the first outlet is changed by controlling the first valve part; wherein the connecting part is further provided with a second outlet, wherein the second outlet is an opening formed by the first channel on the outer surface of the wall of the connecting part, wherein at least part of the second valve part is located on the second mounting seat and between the first inlet and the second outlet, wherein the pressure of the working medium between the first inlet and the second outlet is changed by controlling the second valve part.

13. The integrated component according to claim 12, comprising a first one-way valve, wherein the first one-way valve is located in the first inlet passage and connected to the cover body in a position-limited manner, wherein the first inlet passage is in communication with the liquid storage cavity, and the cover body is connected with the connecting part by inserting.

14. The integrated component according to claim 11, comprising a first one-way valve, wherein the first one-way valve is located in the first inlet passage and connected to the cover body in a position-limited manner, wherein the first inlet passage is in communication with the liquid storage cavity, and the cover body is connected with the connecting part by inserting.

15. The integrated component according to claim 14, wherein the cover body is further provided with a second inlet passage, and the integrated component further comprises a second one-way valve, wherein the second one-way valve is located in the second inlet passage and connected to the cover body in a position-limited manner, wherein the second inlet passage is in communication with the liquid storage cavity.

16. The integrated component according to claim 2, wherein the components comprise a valve part, and the valve part is a three-way valve, wherein the second outlet is an opening formed by the first channel on an outer surface of the wall of the connecting part, at least part of the valve part is located on the mounting seat and between the first outlet and the second outlet, wherein a pressure of the working medium in the first channel is changed by controlling the valve part; or, the components comprise a first valve part and a second valve part, wherein the first valve part and the second valve part are two-way valves, wherein the mounting seat has a first mounting seat and a second mounting seat, wherein at least part of the first valve part is located on the first mounting seat and between the first inlet and the first outlet, wherein the pressure of the working medium between the first inlet and the first outlet is changed by controlling the first valve part; wherein the connecting part is further provided with a third inlet and a second outlet, wherein the second outlet is an opening formed by the first channel on the outer surface of the wall of the connecting part, wherein at least part of the second valve part is located on the second mounting seat and between the first inlet and the second outlet, wherein the pressure of the working medium between the first inlet and the second outlet is changed by controlling the second valve part.

17. The integrated component according to claim 1, wherein the components comprise a valve part, and the valve part is a three-way valve, wherein the second outlet is an opening formed by the first channel on an outer surface of the wall of the connecting part, at least part of the valve part is located on the mounting seat and between the first outlet and the second outlet, wherein a pressure of the working medium in the first channel is changed by controlling the valve part; or, the components comprise a first valve part and a second valve part, wherein the first valve part and the second valve part are two-way valves, wherein the mounting seat has a first mounting seat and a second mounting seat, wherein at least part of the first valve part is located on the first mounting seat and between the first inlet and the first outlet, wherein the pressure of the working medium between the first inlet and the first outlet is changed by controlling the first valve part;

wherein the connecting part is further provided with a third inlet and a second outlet, wherein the second outlet is an opening formed by the first channel on the outer surface of the wall of the connecting part, wherein at least part of the second valve part is located on the second mounting seat and between the first inlet and the second outlet, wherein the pressure of the working medium between the first inlet and the second outlet is changed by controlling the second valve part.

18. The integrated component according to claim 17, wherein the first inlet and the third outlet are located at the top of the connecting part and between the first valve part and the second valve part, wherein the first outlet and the second inlet are located on a same side of the side wall of the connecting part, wherein the third inlet and the second outlet are located on a same side of the side wall of the connecting part.

* * * * *